July 6, 1965  J. N. GRABER ETAL  3,192,995
MASTER SLIDE WITH CORD LOCK
Filed Oct. 23, 1962  2 Sheets-Sheet 2

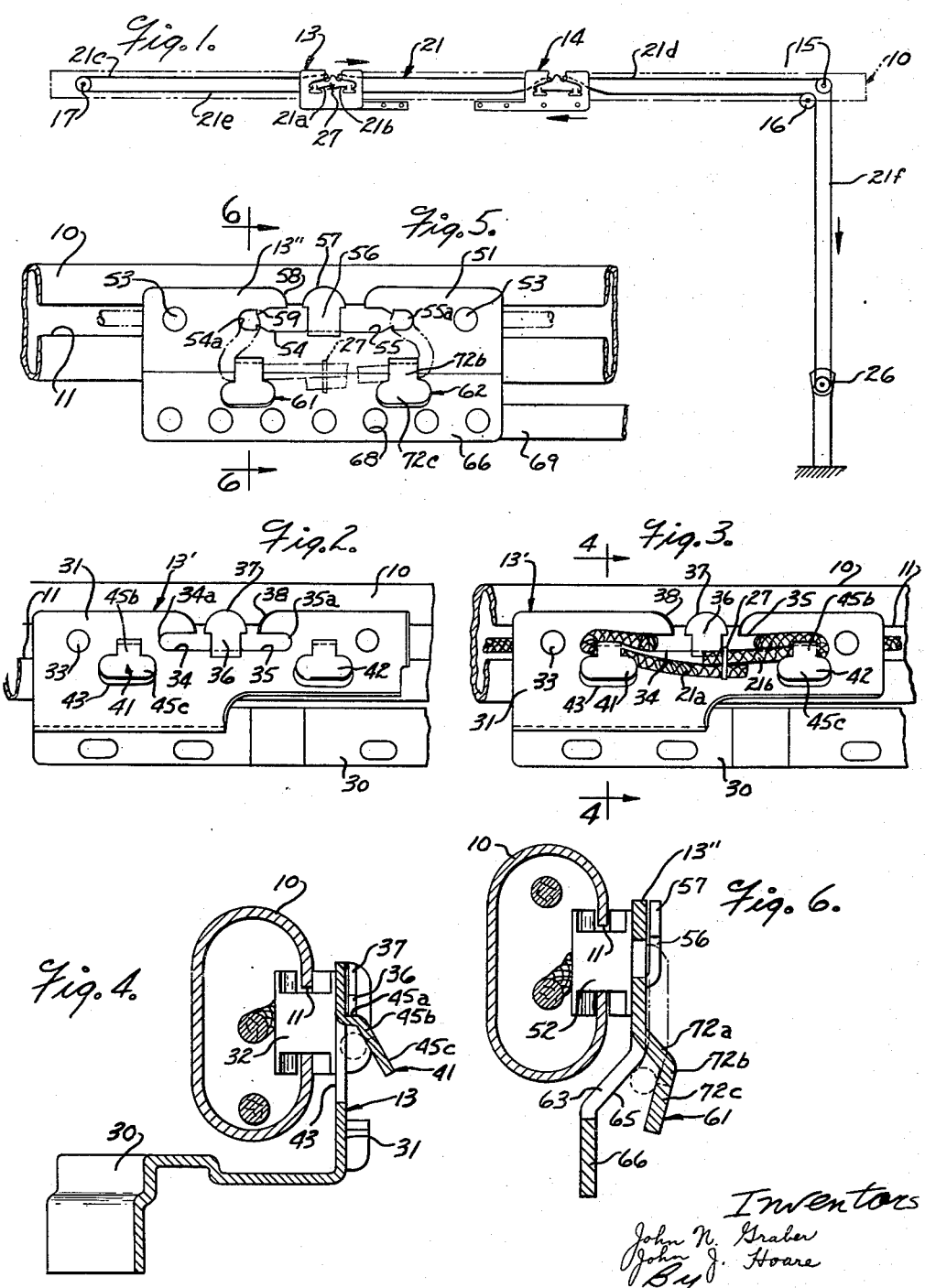

Inventors
John N. Graber
John J. Hoare
By
McCanna, Morsbach & Pillote
Attorneys

# United States Patent Office 3,192,995
Patented July 6, 1965

3,192,995
MASTER SLIDE WITH CORD LOCK
John N. Graber and John J. Hoare, Madison, Wis.,
assignors to Graber Manufacturing Company, Inc.,
Middleton, Wis., a corporation of Wisconsin
Filed Oct. 23, 1962, Ser. No. 232,364
5 Claims. (Cl. 160—345)

This invention relates to drapery fittings and particularly to an improved master carrier for a traverse rod assembly.

An important object of this invention is to provide a master carrier for a traverse rod assembly having an improved cord lock which enables easy insertion, removal and adjustment of the traverse cord on the master slide, and which will reliably prevent slipping of the cord relative to the slide during use of the traverse rod.

Another object of this invention is to provide a master carrier and cord lock assembly which enables independent locking of both ends of the traverse cord to the master carrier without requiring the use of knots in the cord ends.

A further object of this invention is to provide a master carrier and cord lock assembly adapted for independent locking of both ends of the traverse cord to the carrier and which master carrier and cord lock assembly is also adapted for use when the cord ends are interconnected or at an intermediate portion of the traverse cord.

These, together with other objects and advantages of this invention will be more readily understood from the following detailed description when taken in connection with the accompanying drawings wherein:

FIG. 1 is a diagrammatic view of a traverse rod assembly;

FIG. 2 is a rear elevational view of a master carrier having the improved cord lock;

FIG. 3 is a rear elevational view of the master carrier of FIG. 2 and illustrating the manner in which the cord is locked to the carrier;

FIG. 4 is a transverse sectional view taken on the plane 4—4 of FIG. 3;

FIG. 5 is a rear elevational view of a modified form of master carrier and cord lock;

FIG. 6 is a transverse sectional view taken on the plane 6—6 of FIG. 5.

Figure 7:
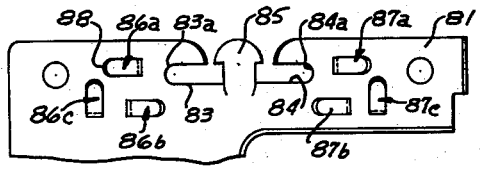
FIGS. 7 and 8 are rear elevational views of a master carrier having another form of cord lock.

The master carrier and cord lock of the present invention is particularly adapted for use in a traverse rod assembly of the type employing a so-called continuous cord loop, and is herein specifically shown and described in connection with such a traverse rod assembly. As diagrammatically shown in FIG. 1, the traverse rod assembly includes a rod 10 having a trackway 11 at the rear side, and overlap and underlap master carriers 13 and 14 slidably mounted in the trackway. The rod, as is conventional, includes a pair of pulleys 15 and 16 at one end, and at least one pulley such as 17 at the other end. A traverse cord 21 has the end portions 21a and 21b attached to one of the master carriers such as 13. The cord includes portions 21c and 21d which extend in relatively opposite directions from the carrier 13 over the pulleys 17 and 15 respectively; a portion 21e that extends from the pulley 17 over the other master carrier 14 and over the pulley 16; and a loop portion 21f that extends downwardly from the pulleys 15 and 16. A floor pulley such as 26 is common provided and engages the loop portion 21f to maintain the cords under tension.

In assembling the drapery rod, the cord is inserted in the rod and entrained over the pulleys before it is attached to the master carriers. In order to avoid the tedious task of drawing separate cord ends from the rod to attach them to a master carrier, the cord ends are advantageously interconnected prior to assembly on the master carrier, to form a continuous cord loop. As best shown in FIG. 3, the end portions 21a and 21b of the cord are overlapped and the end portions are connected by a metal clip or staple 27. It is then a comparatively easy matter to withdraw the connected cord ends from the rod through the use of a hook, and to attach the cord ends to the master carrier. If it is not necessary, after installing the rod, to adjust the length of the cord, then the cord ends can remain connected as shown in FIG. 3. However, the overall length of the traverse cord will vary for different installations and it is necessary to adjust the length of the traverse cord after installation. While this can be achieved by merely cutting the ends of the loop 21f and applying separate cord pulls, it is frequently preferable to retain the endless traverse cord loop for use with the floor pulley 26. In this case it is necessary to remove the excess cord from the ends 21a or 21b of the traverse cord. Heretofore, it has been customary to knot the ends of the cord after cutting, to prevent sliding of the cord off the master carrier. However, since the cord length adjustment is made after the rod is installed over a window and with the slides at the rear side of the rod, knotting of the cords is a tedious task. Moreover, since substantially all of the excess slack must be removed from the cord loop, it is necessary to draw the cord taut while knotting the ends, and to locate the knot closely adjacent the carrier to avoid excess slack. This further complicates the problem of knotting the cord ends.

In accordance with the present invention, at least one of the master carriers is formed with a cord lock so arranged as to enable independent locking of the cord ends to the master carrier, without requiring knotting of the cord ends, to thereby to facilitate adjustment of the cord length. However, the same cord lock arrangement is also adapted for use intermediate the ends of the cord and it is convenient and preferable to form both master slides with the same type cord lock. Only one of the master slides for the traverse rod is specifically described herein, it is being understood that the other master slide can have a similar cord lock arrangement, if desired.

Reference is now made more specifically to the master carrier 13' shown in FIGS. 2–4, and to the cord lock on that master carrier. The master carrier includes an elongated slide plate 31 having slide buttons 32 attached to one side of the plate at longitudinally spaced points therealong, as by fasteners 33. The slide buttons slidably support the master carrier in the trackway at the rear side of the rod 10 and a drapery support arm 30 is provided on the slide and extends to the front of the rod as shown in FIG. 4. The plate has longitudinally spaced cord receiving notches 34 and 35 located intermediate the slide buttons 32, and which notches define oppositely facing cord engaging seats 34a and 35a respectively at the ends of the notches. The notches 34 and 35 open laterally to the top side of the slide plate and a tongue 36 is preferably provided to project upwardly between the notches. The upper end 37 of the tongue 36 and the adjacent portions 38 of the slide plate are advantageously rounded as shown in FIGS. 2 and 3 to aid in guiding the cord between the tongue and the plate. In order to prevent accidental detachment of the cord and disassembly from the notches, the spacing between the tongue and the adjacent portions of the slide plate is preferably made less than the normal thickness of the cord to inhibit upward movement of the cord through the notches. As best shown in FIG. 4, the tongue 36 is offset a slight distance to the rear side of the slide plate 31.

In accordance with the present invention, provision is made for independently locking both end portions 21a and 21b of the cord to the carrier to enable independent adjustment and locking of the cord ends to the carrier. In the embodiment illustrated in FIGS. 2–5, two locking tabs 41 and 42 are provided, one for each end of the traverse cord, and the tabs are arranged with relation to the respective cord engaging seat 34a, 35a to firmly and independently lock the cord ends to the slide plate, when the cord ends are inserted below the tabs. The tabs are similarly formed and, as shown, are in the form of ears which are struck from the slide plates and which form openings 43 (see FIG. 4) in the slide plate. The tabs are integrally joined to the slide plate at one side of the opening 43 and are offset from the slide plate at the side opposite the slide buttons 32. As best shown in FIG. 4, the locking tabs 41 and 42 each include a rearwardly projecting portion 45a, a narrow downwardly and rearwardly inclined locking portion 45b, and a relatively wider portion 45c at the lower end. The locking portion 45b is spaced from the rear side of the side plate 31 a distance less than the thickness of the traverse cord and converges relative thereto to wedge and clamp the cord to the slide plate 43. The enlarged portion 45c provides lateral projections which engage the cord at opposite sides of the locking portion 45b of the tabs as best shown in FIG. 3, and which aid in retaining the cord under the locking portion 45b.

In this embodiment, the locking tabs 41 and 42 are spaced apart a distance greater than the spacing between the cord engaging seats 34a and 35a, and the locking tabs are positioned in approximate longitudinal alignment with the seats. When the cord is initially assembled on the carrier, the connected end portions 21a and 21b of the cord are drawn into the notches 34 and 35 over the tongue 36. As shown in FIG. 3, the cord is then passed from the notches 34 and 35 over the tops of the tabs 41 and 42, and then under the tabs, with the connected ends 21a and 21b located between the locking tabs.

Thus, the locking tabs 41 and 42 are arranged to wedge the cord ends to the slide plate and are, moreover, positioned with relation to the cord engaging seats 34a, 35a so that the cord is formed into several sharp bends as it passes from the seats and under the tabs. In addition, the tabs are positioned with relation to the seats 34a, 35a so that the tension applied to the cords, in moving the carriers along the rod, tends to draw the cord more firmly into the wedge shaped notch formed between the tab and the slide plate. If it is not necessary to adjust the length of the cord loop after installing the rods, then the tabs 41 and 42 function to hold the end portions 21a and 21b of the cord against sliding and avoid tensioning of the clip connection 27 between the cord ends. However, if it is necessary to adjust the length of the cord loop, this can be easily achieved by merely cutting the cord adjacent the clip 27 and then drawing one end of the cord through the slide and reclamping the end of the cord end below the locking tab. Obviously, either or both ends of the cord can be adjusted, if desired.

A modified master slide construction is illustrated in FIGS. 5 and 6. This master carrier designated 13" includes a slide plate 51 having spaced slide buttons 52 attached to one side at longitudinally spaced points as by fasteners 53. The slide has oppositely facing cord receiving notches 54 and 55 located intermediate the slide buttons, and which cord reeciving notches define seats 54a and 55a at the ends of the notches. The notches open to the upper side of the slide plate and a tongue 56 extends upwardly between the ends of the notches. As in the preceding embodiment, the upper end 57 of the tongue and the adjacent portions 58 of the slide plate are rounded to aid in guiding the cord into the notches, and the tongue is preferably offset to the rear side of the plate, as best shown in FIG. 6. Teeth 59 are advantageously formed in the notches adjacent the ends thereof and shaped to enable relatively easy movement of the cord into the ends of the notches but to inhibit movement of the cord out of the notches, to prevent accidental detachment of the cords from the notches.

In this embodiment, a pair of locking tabs designated 61 and 62 are provided, one for each end of the cord. These tabs are in the form of ears struck from the plate adjacent the ends of the notches and forms openings 63 in the plate. The tabs are laterally offset from the rear side of the plate and overlie the openings 63, and are positioned below the respective seats 54a and 55a. In the form shown, the master carrier slide plate 51 has an angulated lower end portion 65 which terminates in a downwardly extending portion 66 having spaced openings 68 for mounting the drapery support arm 69 thereon. The tabs 61 and 62 are spaced laterally from the angulated portion 65 and, as best shown in FIG. 6, each tab includes a downwardly and rearwardly inclined portion 72a and a downwardly and forwardly inclined locking portion 72b which diverges slightly with respect to the angulated portion 65 of the slide plate and which is spaced therefrom a distance less than the thickness of a traverse cord to clamp or wedge the traverse cord to the plate. The lower end portion 72c of the tabs are enlarged, as best shown in FIG. 5, to engage the cord and retain the same adjacent the locking portion 72b. As shown in FIG. 5, the end portions 21a and 21b of the traverse cord are passed from the cord engaging seats 54a and 55b downwardly and around the outer edges of the locking tabs, and then inwardly below the locking tabs 61 and 62, with the connected ends of the cord located between the locking tabs. In order to adjust the length of the traverse cords, it is only necessary to cut the cord adjacent the clip 27 and draw the cord through the master slide to achieve the proper length, after which the cord end is passed under the tab to clamp the same in position.

Figure 8:
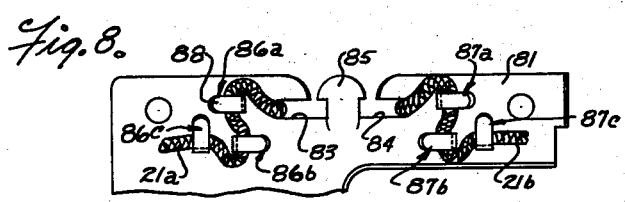
Figure 9:
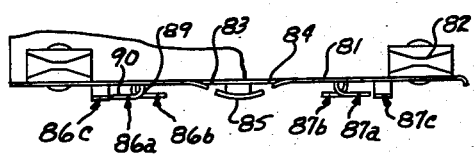
FIG. 9 is a plan view of the carrier of FIG. 7.

In the embodiment of FIGS. 7–9, the carrier includes a slide plate 81 having spaced slide buttons 82 attached to the front side for slidably supporting the carrier on the traverse rod. The plate has cord receiving notches 83 and 84 which open at the upper edge of the slide plate and which form oppositely facing cord engaging seats 83a and 84a at the ends of the notches. A tongue 85 is provided between the notches. The cord receiving notches and tongue are generally similar to that shown and described in connection with FIGS. 1–4 and further detailed description is deemed unnecessary.

A modified form of cord lock is illustrated for independently locking both ends of the cord to the carrier. As shown, a plurality of locking tabs designated 86a, 86b and 86c, and 87a, 87b, 87c are provided for locking the cord ends 21a and 21b respectively. The locking tabs are each similarly formed by striking an ear from the slide plate. The struck ears openings 88 below each tab, and each tab is integrally connected to the plate along one side of the opening and as shown in FIG. 9, has a rearwardly extending portion 89 and a clamping portion 90 spaced from the rear side of the plate a distance no greater than the thickness of the traverse cord to clamp the cord to the plate. The several locking tabs are positioned and oriented with relation to the respective cord engaging seats 83a, 84a and to each other so as to form multiple bends in the cord when it is inserted under the tabs, to lock the cord to the carrier. As shown, the tabs 86a, 87a are positioned outwardly of the respective cord engaging seats 83a, 84a and project outwardly toward the ends of the slide plate. The tabs 86b and 87b are positioned below the respective tabs 86a and 87a and extend in a relatively opposite direction toward the center of the slide plate. The tabs 86c and 87c are positioned outwardly of the tabs 86b and 87b respectively and extend upwardly. The cord ends 21a and 21b, when attached to the slide plate, extend from the respective cord engaging seats 83a and 83b outwardly, and downwardly under tabs 86a, 86b and 87a, 87b, and then outwardly and under tabs 86c, 87c. The cord ends are thus bent several times in passing over the locking tabs. By reason of the multiple bends formed in the cord, and the multiple locking tabs for each cord end, each locking tab only has to exert a relatively light locking pressure. Thus, the tabs are preferably spaced from the slide plate a distance only slightly less than the thickness of the traverse cord to lightly clamp the cord. With this arrangement, the cords can be easily inserted and removed from below the tabs.

Figure 10:
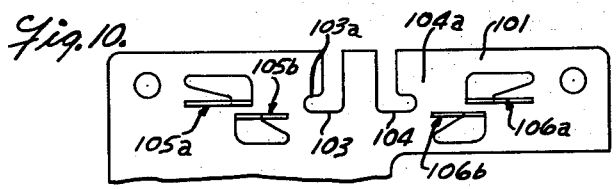
FIGS. 10 and 11 are rear elevational views of a master carrier having still another form of cord lock.
Figure 11:
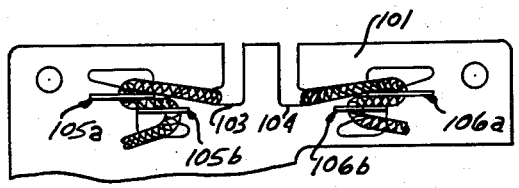
Figure 12:
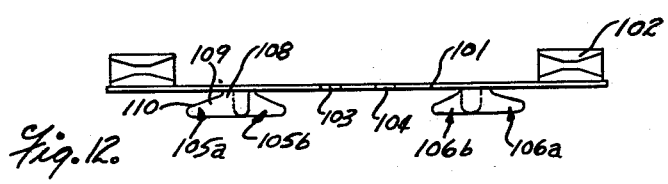
FIG. 12 is a plan view of the carrier of FIG. 11.

A master carrier having a modified form of multiple tab cord lock is shown in FIGS. 10–12. The master carrier includes a slide plate 101 having the conventional slide buttons 102 for supporting the carrier on the traverse rod. The slide plate has spaced cord receiving notches 103 and 104 which open at the top edge of the slide plate and which form cord engaging seats 103a and 104a at the ends of the notches.

The cord lock includes a pair of locking tabs 105a, and 105b and 106a, 106b located adjacent the cord seats 103a and 104a respectively. The locking tabs are each similarly formed and as best shown in FIG. 12, have a generally L-shaped configuration. The tabs are conveniently struck from the slide plate and bent to extend at generally right angles to the slide plate. As best shown in FIG. 12, one leg 108 of each tab remains integrally joined to the slide plate. The other leg 109 has the edge 110 thereof adjacent the slide plate shaped to diverge relative to the plate in a direction away from the attached leg of the tab. At its convergent end, the leg 106b is spaced from the plate a distance less than the cord thickness to wedge the cord to the plate.

As will be seen from FIGS. 10 and 11, the tabs 105a and 106a are spaced longitudinally from the respective cord engaging seats 103a and 104a, and the tabs extend from their attached ends toward the ends of the slide plate. The other tabs 105b and 106b of each pair are positioned below the respective tabs 105a and 106a and are preferably spaced apart a distance approximately equal to the thickness of the traverse cord to grip the cord therebetween, as shown in FIG. 11. The pairs of tabs 105a, 105b and 106a, 106b, overlap in part. However, the tabs 105b and 106b face in a direction opposite to that of the associated tabs 105a and 106a, and the tabs of each pair are positioned relative to each other so as to produce a sharp bend in the cord as it passes from one tab to the other. When the cord ends 21a and 21b are attached to the slide plate, the cord ends extend outwardly from the respective seats 103a, 104a, over the tabs 105a, 106a, inwardly between the tabs of each pair, and downwardly under the locking leg of the lower tabs 105b and 106b.

From the foregoing, it will be seen that the master slide and cord lock arrangements will enable both ends of the traverse cord to be independently clamped to the master carrier, for easy installation, removal or adjustment of the cord length. The cord lock arrangement clamps the ends of the cord to the master slide without use of knots at the cord ends and thus enables easy adjustment of the cord length, even after the rod is installed with the slides at the rear side of the rod.

We claim:
1. In combination, a traverse rod assembly including a traverse rod and a traverse cord, a drapery rod master carrier comprising an elongated slide plate having slide buttons attached to one side at spaced points therealong slidably supporting the plate on the rod, said slide plate having first and second cord receiving notches located intermediate said slide buttons defining first and second oppositely facing cord engaging seats at the ends of the first and second notches receiving the end portions of the traverse cord, and first and second locking tab means on the plate respectively adjacent said first and second cord engaging seats independently locking the end portions of the cord to the carrier, said first and second locking tab means each including at least one tab integrally joined at one end to the plate and having a locking portion laterally spaced from the other side of said plate a distance less than the thickness of the traverse cord to wedge and clamp the cord ends to the plate, said one tab of said first and second locking tab means being spaced apart a distance greater than the spacing between said seats and located relative to the first and second seats to form a reverse bend in the cord ends as they pass through the respective cord seat and under the locking portion of said one tab associated with each seat.

2. The combination of claim 1 wherein said tabs have a generally T-shaped configuration and provide lateral cord engaging projections on the tabs spaced from the end thereof which is attached to the slide plate for retaining the cord ends under the locking portions on the respective locking tabs.

3. In combination, a traverse rod assembly including a traverse rod and a traverse cord, a drapery rod master carrier comprising an elongated slide plate having slide buttons attached to one side at longitudinally spaced points therealong slidably supporting the slide plate on the traverse rod, said slide plate having first and second cord receiving notches located intermediate said slide buttons receiving the end portions of the traverse cord and defining first and second cord engaging seats at the ends of the first and second notches, said notches opening at one edge of the plate, a tongue on the plate between the open ends of the notches, and first and second locking tab means on the plate respectively adjacent said first and second cord engaging seats independently locking the end portions of the cord to the carrier, said locking means each including an ear struck from the plate defining an opening and providing a locking tab integrally joined at its upper end to the plate at one side of the opening, each of said downwardly extending locking tabs having a locking portion offset to the other side of the plate a distance less than the thickness of the draw cord to wedge the cord to the plate across the respective opening, said tabs also including a transversely extending portion spaced from said one end for retaining the cord under said locking portion, said locking tabs of said first and second locking tab means having the outer side edges of said downwardly extending locking portions disposed transverse to a line through said seats and spaced apart in a direction parallel to that line a distance at least equal to the spacing between said seats to form a sharp bend in the cord ends as they pass through the respective one of the cord seats and under the locking portion of the tab associated with each seat.

4. In combination, a traverse rod assembly including a traverse rod and a traverse cord, a drapery rod master carrier comprising, an elongated slide plate having slide buttons attached to one side at longitudinally spaced points therealong slidably supporting the slide plate on a traverse rod, said slide plate having first and second cord receiving notches located intermediate its ends receiving the end portions of a traverse cord, and first and second sets of locking tabs on said plate located between the respective cord engaging seat and the adjacent end of the slide plate, said first and second sets of locking tabs including at least two locking tabs spaced apart in a direction crosswise of the plate, said locking tabs each having one end attached to the plate and a locking portion laterally offset from the plate a distance to clamp a cord end to the plate, the locking portions of the tabs of each set extending in relatively opposite directions.

5. The combination of claim 4 wherein the tabs of each set are spaced apart in a direction crosswise of the slide plate a distance approximately equal to the cord diameter to grip the cord therebetween as the cord is passed from one tab to the other tab of each set.

References Cited by the Examiner

UNITED STATES PATENTS

| 1,581,806 | 4/26 | Kirsch | 160—126 |
| 1,876,060 | 9/32 | Kirsch | 160—346 X |
| 2,154,610 | 4/39 | Fleury | 24—129 |
| 2,220,366 | 11/40 | Fly | 24—71.3 |
| 2,456,554 | 12/48 | Churchill | 24—123 |
| 2,644,517 | 7/53 | Graber | 160—346 |
| 2,903,327 | 10/59 | Macy | 160—133 |
| 3,040,373 | 6/62 | Graber et al. | 160—126 |

HARRISON R. MOSELEY, *Primary Examiner.*